Aug. 25, 1942.                D. E. MORRISON                    2,293,746
                           ANGLE OF DIVE INSTRUMENT
                             Filed April 9, 1941              2 Sheets-Sheet 1
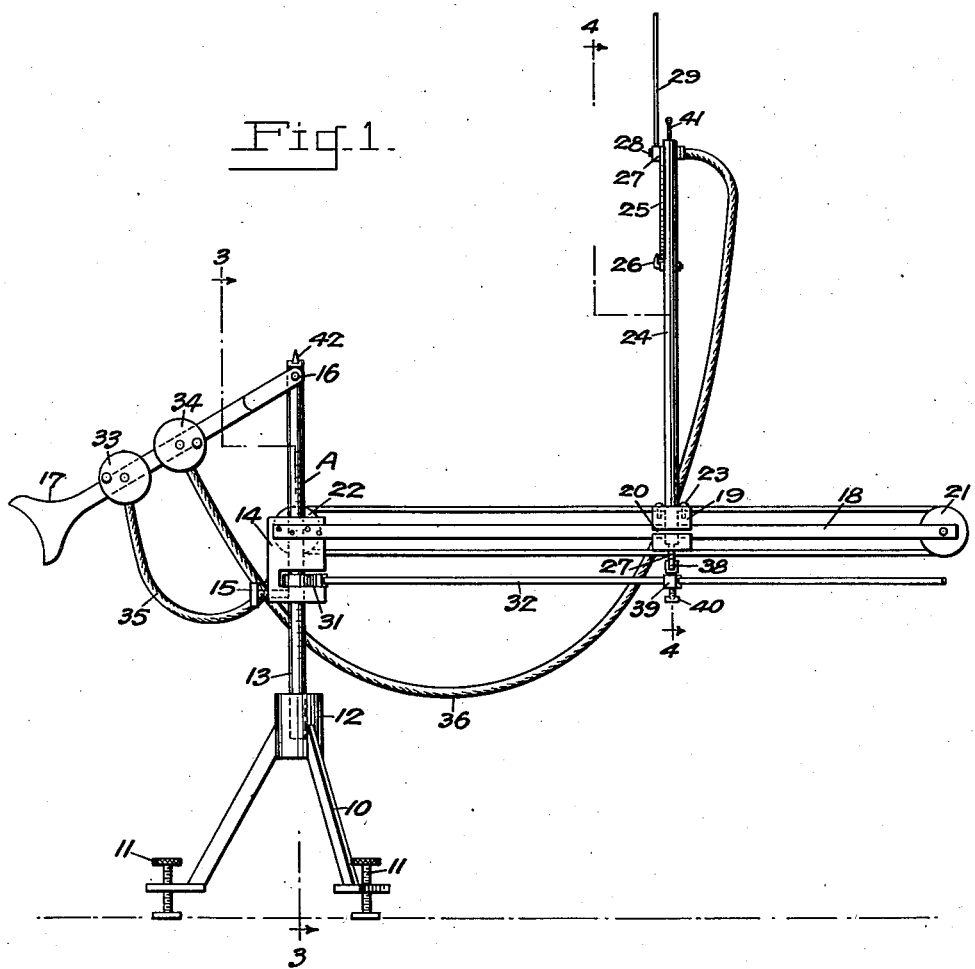
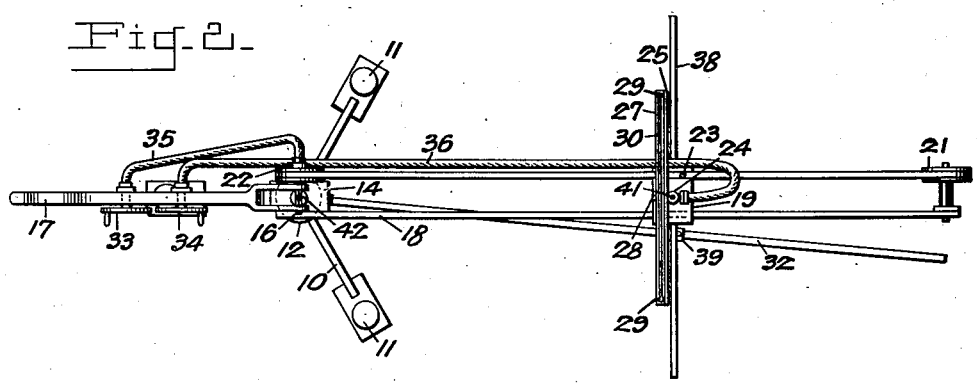
INVENTOR
Douglas E Morrison
BY
ATTORNEYS Aug. 25, 1942.  D. E. MORRISON  2,293,746
ANGLE OF DIVE INSTRUMENT
Filed April 9, 1941  2 Sheets-Sheet 2
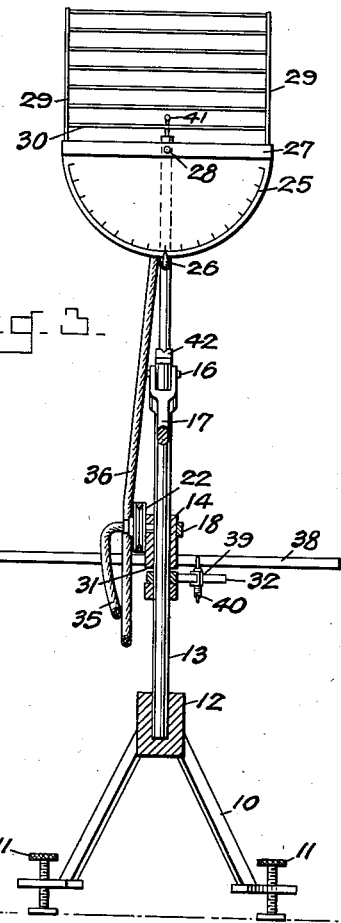
Fig. 3.
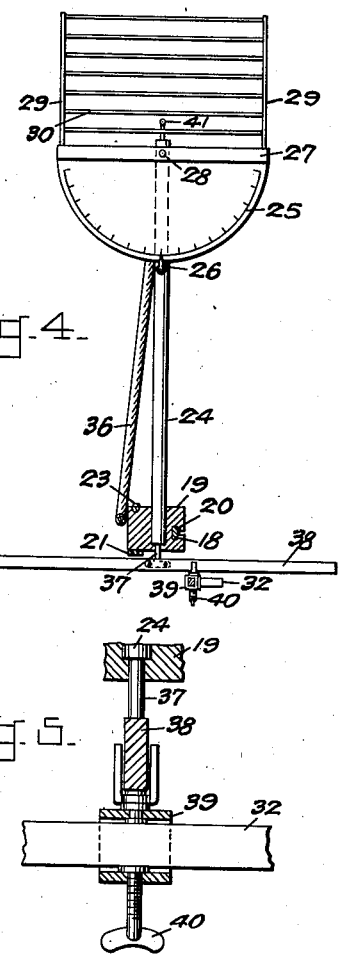
Fig. 4.
Fig. 5.
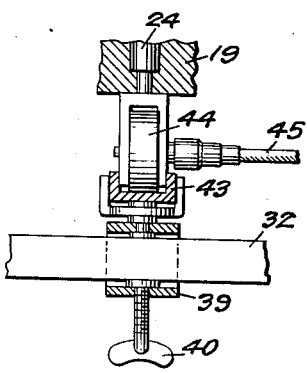
Fig. 6.
INVENTOR
Douglas E. Morrison
BY Kessenich & Church
ATTORNEYS Patented Aug. 25, 1942

2,293,746

UNITED STATES PATENT OFFICE 2,293,746

ANGLE OF DIVE INSTRUMENT

Douglas E. Morrison, United States Army, Trenton, Ga.

Application April 9, 1941, Serial No. 387,660

11 Claims. (Cl. 33—69)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument for determining the direction of travel and angle of dive of aerial targets.

A principal object of the invention is to provide a simple, rugged, economical instrument adapted for use in furnishing the angle of dive to a data computer adapted to calculate firing data on diving aerial targets.

A further object of the invention is to provide a simple, accurate functioning instrument adapted to be organized in highly compacted arrangement and produced in quantities at low cost whereby it will be available for antiaircraft intelligence service.

The specific nature of the invention as well as other objects and advantages thereof will clearly appear from a description of a preferred embodiment as shown in the accompanying drawings in which:

Fig. 1 is a side elevation of the instrument of this invention;

Fig. 2 is a plan view of the structure shown in Fig. 1;

Fig. 3 is a sectional view taken upon the line 3—3 of Fig. 1;

Fig. 4 is a sectional view taken upon the line 4—4 of Fig. 1;

Fig. 5 is an enlarged sectional detail view showing the manner in which the travel bar is connected to the altitude shaft and damper bar, and Fig. 6 is an enlarged sectional detail view showing a modification of the detail shown in Fig. 5.

Referring now to the drawings, there is shown in Fig. 1 a support in the form of a tripod 10 provided with suitable means 11 for leveling the tripod head 12.

A central supporting bar or shaft 13 is rotatably mounted in the head 12 for rotation about a vertical axis when the tripod head is level and is suitably inscribed with or otherwise has an altitude scale A affixed thereon.

Mounted upon the central bar 13 for sliding movement is a main block 14 adapted to be adjusted in altitude to the scale A and retained in adjusted position by a set screw or similar fastening 15 engageable with the shaft.

Secured to the upper end portion of shaft 13 by means of a transverse pin 16 is a shoulder rest 17 so mounted as to be movable in a vertical plane containing the shaft 13 and shoulder rest.

A slide bar 18 is rigidly secured to the main block 14 so as to extend therefrom normally of the central bar 13 in a horizontal position when the instrument is arranged to serve its normal functions. Arranged to slide on the horizontal slide bar 18 is a slide block 19 conveniently provided with a T-cut 20 on one side to receive the slide bar to facilitate a sliding mount of the block. Adjacent the outer end portion of the slide bar 18, there is mounted for rotation about an axis transversely of the bar and to one side thereof a front pulley 21. A similar pulley 22 is mounted on the main block 14 in horizontal alignment with and for rotation about an axis parallel to the axis of rotation of pulley 21. A suitable belt, such as of the V-type, is trained over the pulleys 21 and 22 and is secured to the slide block 18 as by the fastening means 23.

An altitude bar 24 is freely rotatably mounted in the slide block 19 in parallelism with the central bar 13 and has an arcuate dive scale 25 pivoted thereto through means of a dive bar 27 and pivot pin 28 rigidly secured to the latter adjacent the upper end portion of the bar 24 for pivotal motion in a plane parallel to the axis thereof. A pointer 26 is secured to the altitude bar just below the dive scale to indicate angular displacement of the scale from its position of zero displacement as seen in Fig. 3. The dive bar 27 is secured to the upper edge of the dive scale in such manner as to occupy a horizontal position in the normal zero displaced position of the scale and has affixed thereto by means of upright spaced parallel standards 29 a plurality of vertically spaced wires 30 disposed in parallelism with each other and with the dive bar 27.

The main block 14 is recessed inwardly from its front face as indicated at 31 so as to receive the end of a damper bar 32 which is journaled about the central bar 13 for rotatable movement in the horizontal plane parallel to the slide bar 18 independently of the main block.

Two handwheels 33 and 34 are rotatably mounted on the shoulder rest 17 for rotation about horizontal axes. The handwheel 33 is suitably connected, as by the flexible cable 35, to the rear pulley 22 so as to rotate the latter upon rotation of the handwheel to displace the belt and position the slide block 19 upon the slide bar 18. Similarly the handwheel 34 is connected as by the flexible cable 36 to the pivot pin 28 to rotate the latter and therethrough the dive scale 25, dive bar 27, and grid wires 30.

A pin 37 rigidly affixed to the lower end of the altitude bar 24 projects in depending relation to the bar and has secured thereto a travel bar 38 intermediate the ends of the latter. The travel bar 38 is arranged between the slide bar 18 and damper bar 32 in parallel relation therewith and functions in a manner similar to the travel channel 103 of my copending application, Serial No. 387,657 filed April 9, 1941.

A swivel clamp 39 is slidably mounted upon the damper bar 32 and may be locked in desired position by the clamp screw 40. The upper portion of the clamp is formed to receive the travel bar 38 as shown in Fig. 5.

Front and rear sights 41 and 42 are attached to the upper ends of the altitude and central bars 24 and 13, respectively, as seen in Fig. 1 although it will be understood that the rear sight 42 may be mounted upon the shoulder rest 17 if preferred.

In operation the main block 14 will be raised on the central bar 13 to the altitude of the designated target as indicated by the scale A and clamped by means of the set screw 15. If conditions require, the altitude of the target may be estimated. The observer by means of the shoulder rest 17 trains the sights 41, 42 upon the designated target in azimuth through rotating the central bar 13 and the instrumental parts attached thereto and then aligns the sights in angular height upon the target by rotating handwheel 33 to translate the slide block 19, altitude bar 24 and front sight 41 until the sights are trained upon said target. The travel bar operator swings the damper bar into alignment with the slide bar and upon indication that the observer has his sights trained upon the target brings the swiveled damper clamp 39 directly under the altitude bar and clamps the same in such position. The damper bar is then held stationary and further tracking of the target will cause the travel bar 38 to assume a position parallel to the target's course, which, if desired as a numerical value, may be obtained from an azimuth scale oriented in any conventional manner. For example, an azimuth circle may be fastened to the tripod head 12 adjustable for orientation purposes and an azimuth pointer positioned by means of a double parallelogram so that the pointer will always occupy a position parallel to the travel bar; that is, one of the outer ends of the double parallelogram would serve as the azimuth pointer and the other outer end as a part of or attached to the travel bar.

Upon indication that the target is entering into a dive, the observer ceases to track with the sights 41, 42 and by means of handwheel 34 depresses the dive scale 25 to a position where the target appears to move parallel to the grid wires 30 from whence the angle of dive as indicated by pointer 26 may be read.

In an organized fire control system the instrument of this application may be arranged to occupy a functional relationship to the other instruments of the fire control system in a manner similar to the arrangement of instrument T in Fig. 1 of said copending application.

If it is desired to determine ground speeds of targets, a channel bar 43 may be substituted for the travel bar 38 and a speedometer wheel 44 attached to the altitude bar 24 as indicated in Fig. 6. The speedometer wheel may be connected as by the flexible cable 45 to a suitable speedometer in a manner similar to the arrangement shown in my copending application above referred to.

The instrument will be useful independently of an organized fire control system in determining the course and speed of targets, for the course will always be correct even if the altitude is not known.

Having now described a present preferred embodiment of the invention, I claim:

1. In a course and dive instrument in combination, a vertically disposed rotatable central bar having an altitude scale therealong, a main block slidably mounted upon the central bar in accordance with said scale, means for securing the main block to the central bar in adjusted position, a horizontally disposed slide bar secured to the main block, a block slidably mounted on the slide bar, a vertically disposed altitude shaft rotatably mounted in the slide block, means for moving the slide block along said slide bar, a travel bar rigidly secured to the altitude shaft, and means relatively movable on and along the travel bar for maintaining movement thereof by movement of the altitude shaft through a point coinciding with an initial position of the altitude shaft.

2. In a course and dive instrument in combination, a vertically disposed rotatable central bar having an altitude scale therealong, a main block slidably mounted upon the central bar in accordance with said scale, means for securing the main block to the central bar in adjusted position, a horizontally disposed slide bar secured to the main block, a block slidably mounted on the slide bar, a vertically disposed altitude shaft rotatably mounted in the slide block, means for sliding the slide block along the slide bar, a damper bar rotatably mounted upon the central bar for rotation independent of the main block, a travel bar rigidly secured intermediate its ends to the altitude shaft, and a clamp secured to the damper bar movable on and along said travel bar for maintaining movement of the travel bar by the altitude shaft through a point coinciding with an initial position of said altitude shaft.

3. In a course and dive instrument in combination, a vertically disposed rotatable central bar having an altitude scale therealong, a main block slidably mounted upon the central bar in accordance with the scale, means for securing the main block to the central bar in adjusted position, a horizontally disposed slide bar secured to the main block, a block slidably mounted on the slide bar, a vertically disposed altitude shaft rotatably mounted in the slide block, means for sliding the slide block upon the slide bar, a damper bar rotatably mounted upon the central bar for rotation independent of the main block, a travel bar rigidly secured intermediate its ends to the altitude shaft, a clamp adjustably secured to the damper bar movable on and along said travel bar and engageable with the travel bar at an initial point in vertical alignment with said altitude shaft, and a dive scale comprising a scale member and a plurality of spaced parallel members secured thereto pivotally mounted on the altitude shaft for rotation in a plane parallel to the plane of the axis of the altitude shaft.

4. The structure of claim 3 in combination with means for rotating said central bar comprising a shoulder rest secured to the central bar for pivotal movement in a plane containing the axis of the central bar.

5. The structure of claim 3 in combination with means for rotating said central bar comprising a shoulder rest secured to the central bar for pivotal movement in a plane containing the axis of the central bar, and front and rear sights secured to the altitude shaft and adjacent the central bar, respectively.

6. The structure of claim 3 in combination with a shoulder rest secured to said central bar for pivotal movement in a plane containing the axis of the latter, and wherein said means for sliding said slide block comprises a front pulley secured to the slide bar, a rear pulley secured to the main block, a belt trained over said pulleys and secured to the slide block, a handwheel secured to the shoulder rest, and a flexible cable attached to the handwheel and said rear pulley; whereby said slide block and attached belt may be driven upon rotation of the handwheel.

7. The structure of claim 3 in combination with a shoulder rest secured to said central bar for pivotal movement in a plane containing the axis of the latter, a handwheel secured to the shoulder rest, and a flexible cable secured to the handwheel and dive scale; whereby the dive scale may be rotated by said handwheel from the shoulder rest.

8. In a course and dive instrument in combination, a vertically disposed rotatable central bar having an altitude scale therealong, a shoulder rest pivotally secured to the central bar for pivotal movement in the plane of the axis thereof, a main block slidably mounted upon the central bar in accordance with said scale, means for adjustably securing the main block upon the central bar, a horizontally disposed slide bar secured to the main block, a block slidably mounted on the slide bar, a vertically disposed altitude shaft rotatably mounted in the slide block, a front pulley secured to the slide bar, a rear pulley secured to the main block in alignment with said front pulley, a belt trained over said pulleys and secured to the slide block, a handwheel mounted upon the shoulder rest, a flexible cable secured to the handwheel and rear pulley for rotating the latter, a damper bar rotatably mounted upon the central bar for rotation in a plane parallel to and below the slide bar, a travel bar rigidly secured intermediate its ends to the altitude shaft between the slide and damper bars in parallel relation thereto, a swiveled damper clamp adjustably secured to the damper bar and having a portion movable on and along the travel bar to restrain pivotal motion of the latter, a dive scale comprising a scale member and a plurality of spaced parallel elements secured thereto pivotally mounted on the altitude shaft for rotation in a plane parallel to the plane of the axis of the altitude shaft, a second handwheel mounted upon said shoulder rest and a flexible cable connecting the second handwheel and dive scale to rotate the latter.

9. The structure of claim 8 wherein said main block is recessed about the central bar and said damper bar is rotatably mounted upon the central bar within said recess of the main block.

10. In a course and dive instrument in combination, a vertically disposed rotatable central bar having an altitude scale therealong, a main block slidably mounted upon the central bar in accordance with said scale, means for adjustably securing the main block upon the central bar, a horizontally disposed slide bar secured to the main block, a block slidably mounted upon the slide bar, a vertically disposed altitude shaft rotatably mounted in the slide block, means for moving the slide block, a speedometer wheel secured to the altitude shaft for rotation about an axis transverse thereof, a damper bar rotatably mounted upon the central bar for rotation independent of the main block, a travel bar of channel section adapted to receive said speedometer wheel and adjustable means on said damper bar for supporting said travel channel.

11. In a course and dive instrument in combination, a vertically disposed rotatable central bar having an altitude scale therealong, a shoulder rest secured to the central bar for pivotal movement in the plane of the axis thereof, a main block slidably mounted upon the central bar in accordance with said scale, means for adjustably securing the main block to the central bar, a horizontally disposed slide bar mounted on the main block, a block slidably mounted on the slide bar, a vertically disposed altitude shaft rotatably mounted in the slide block, means for moving the slide block, a dive scale comprising a scale member and a plurality of spaced parallel elements secured thereto pivotally mounted on the altitude shaft for rotation in a plane normal to the plane containing the axes of the altitude shaft and control bar, a handwheel mounted on the shoulder rest, and a flexible cable connecting the dive scale and handwheel for rotating the dive scale.

DOUGLAS E. MORRISON.